Nov. 3, 1959 M. E. LAZAR ET AL 2,911,036
SPRAY-DRYING APPARATUS
Filed Jan. 3, 1955 2 Sheets-Sheet 1

M.E. LAZAR &
A.H. BROWN
INVENTORS

M.E. LAZAR &
A.H. BROWN
INVENTORS

United States Patent Office 2,911,036
Patented Nov. 3, 1959

2,911,036

SPRAY-DRYING APPARATUS

Melvin E. Lazar, Oakland, and Amon H. Brown, El Cerrito, Calif., assignors to the United States of America as represented by the Secretary of Agriculture Application January 3, 1955, Serial No. 479,686

2 Claims. (Cl. 159—4)

(Granted under Title 35, U.S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to devices and methods for spray-drying liquids, particularly liquid foodstuffs. A specific object of the invention is the provision of apparatus and processes whereby to prevent agglomeration of dried particles during spray-drying and subsequent to removal of the particles from the spray-drying system. Further objects and advantages of the invention will be evident from the description herein taken in connection with the appended drawing.

Figure 1:
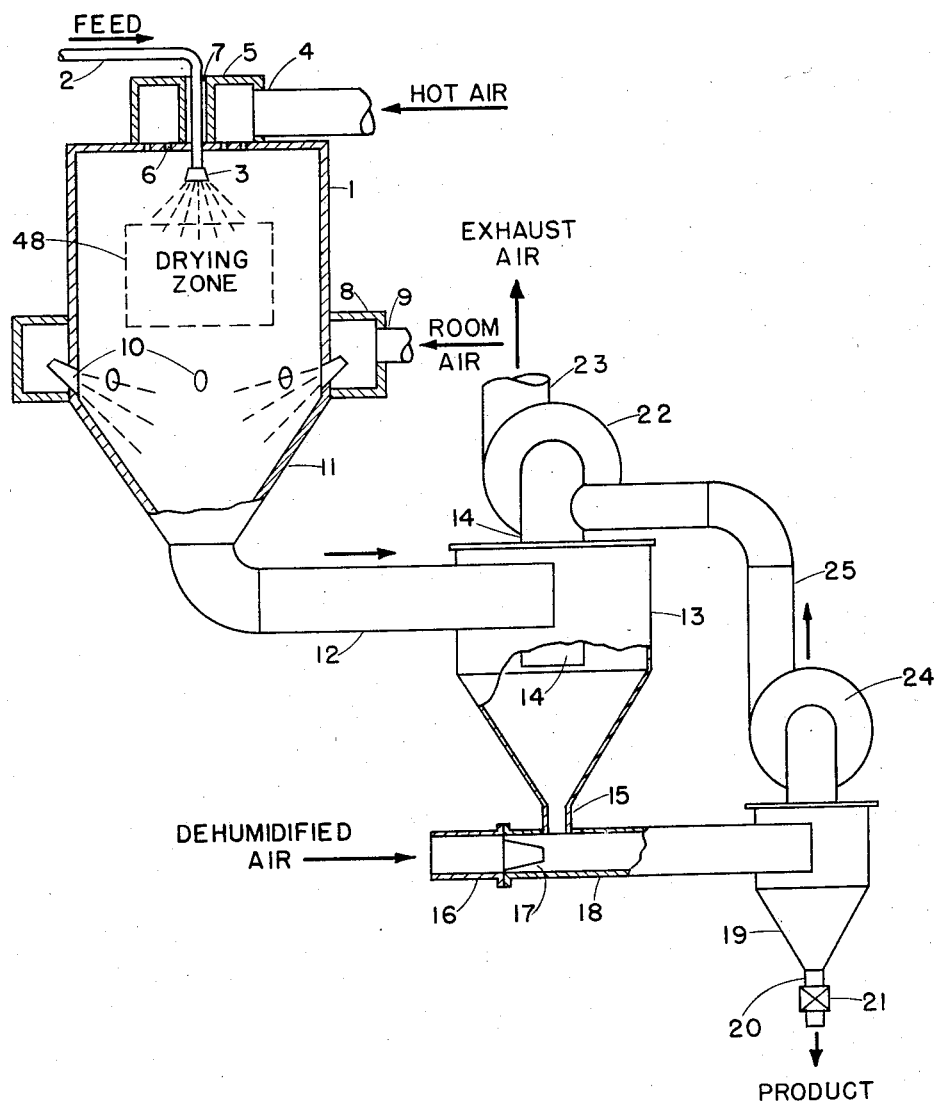
Figure 2:
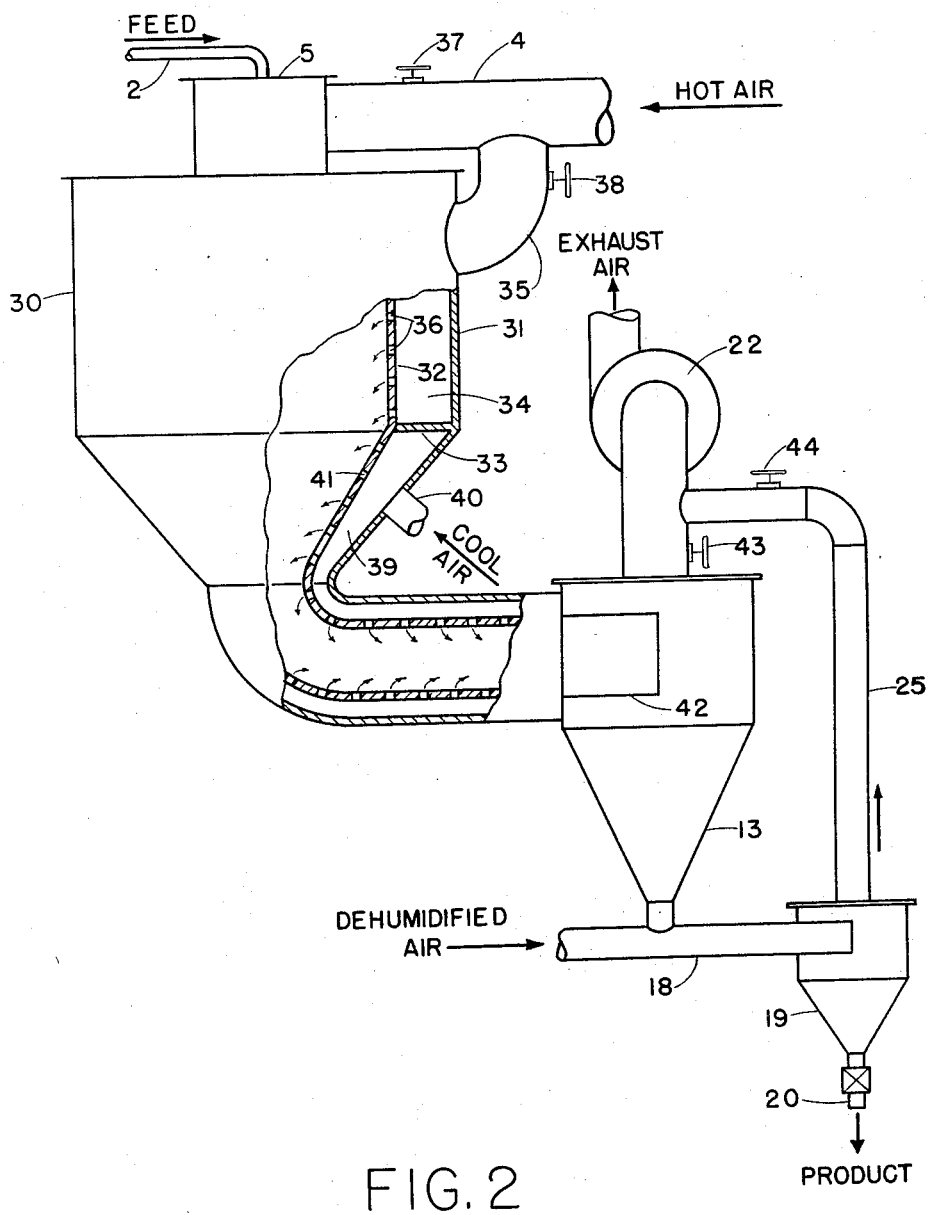

In the drawing, Figs. 1 and 2 are elevations, partly in cross section, each representing a modification of spray-drying equipment within the purview of this invention. In the figures, like numerals indicate like parts.

It is well known in the dehydration art that materials such as eggs, milk, soap solutions, synthetic detergent solutions, etc. can be spray-dried to give useful powdered products. However, when conventional spray-drying techniques are applied to fruit and vegetable juices many difficulties arise and the procedure is not successful. One of the principal difficulties encountered is that the dried particles tend to agglomerate into sticky masses of material. This agglomeration may occur at different places. For example, the particles may stick to the walls of the drier or to the walls of the conduit which is intended to conduct the particles and exhaust air to the collection system. In many cases this sticking tendency is so severe that no dried product is collected at all because it is stuck to the walls of the drier chamber or outlet conduit. When some of the dried product is successfully carried out of the drier chamber by the exhaust air stream it will be found that this material will agglomerate in the receiver in which it is collected, forming a tough mass which is exceedingly difficult to utilize because of its extremely low rate of reconstitution in water.

The agglomerating tendency of spray-dried fruit and vegetable powders is based on the fact that these products have low melting points and are very hygroscopic. The agglomeration is believed to be the result of what may be termed a surface fusion, that is, the surfaces of the individual particles become fused or softened so that they are sticky and the individual particles then cohere into large masses. Fruit and vegetable powders have low melting points to begin with and if they absorb any moisture from the surrounding atmosphere, their melting points are further lowered so that the fusion effect takes place at a considerably lower temperature, often even at room temperature. In drying fruit and vegetable products by conventional spray-drying, the dried particles stick to the walls of the drying chamber and exhaust conduit because the particles are so hot that their surfaces are sticky and on colliding with any solid surface the particles adhere tenaciously thereto. Dried product which manages to avoid sticking to the walls of the drying chamber or exhaust conduit is naturally surrounded by a large volume of the exhaust, humid air. When this product is removed from the drying system some of the humid exhaust air accompanies the product and as the material cools it absorbs the moisture from this humid air and so becomes sticky and coheres into a tough mass.

Fruit and vegetable powders being of a heterogeneous nature do not have sharp melting points and it is more accurate to characterize them by their sticky point, that is, the temperature at which they loose their free-flowing nature and become sticky and cohere into masses. It is conventional to measure the sticky point of such powders by placing a small amount thereof in a test tube equipped with a small propeller-type stirrer. The test tube is then immersed in a heating bath and heat is applied to raise the temperature of the powder at a constant rate. Meanwhile the powder is continuously stirred and the temperature at which the powder suddenly gums together is noted and referred to as the sticky point.

To illustrate the correlation of sticky point temperature and moisture content of tomato powder, for example, the following information is supplied:

| Moisture content of tomato powder, percent | Sticky point, °F. |
|---|---|
| 1 | 155 |
| 2 | 144 |
| 3 | 131 |
| 4 | 122 |
| 5 | 110 |
| 6 | 100 |

It is evident from the above data that if tomato powder of, say, 2% moisture content is held at a temperature below 144° F., it will remain as a free-flowing powder whereas if it is subjected to a temperature of 144° F., or above, it will cohere into an agglomerted mass. Further, if this same product (2% moisture) is kept in an atmosphere from which it can absorb moisture, then the sticky point temperature of the product will decrease as its moisture content rises. Similar sticky point temperature-moisture content relationships exist for virtually all fruit and vegetable powders and can readily be determined by the technique outlined above.

Because of the agglomerating tendency of fruit and vegetable powders, the previous techniques of spray-drying applied to these materials have never been successful despite considerable investigation and experimentation in many quarters. For example, spray-driers have been constructed in which the interior of the freezing chamber is provided with knives or scrapers which continuously scrape material off the chamber walls. Such a system is of little value when drying fruit products because as the material is scraped off it forms large, rolled-up, taffy-like masses which cannot be broken apart and which are virtually impossible to reconstitute in water.

We have devised apparatus and methods whereby the above-outlined disadvantages are completely obviated. When spray-drying fruit and vegetable materials in accordance with this invention no agglomeration of the product occurs. The product does not stick to the walls of the drying chamber nor to the walls of the exhaust conduit to any significant extent. The result is that essentially all the product is collected as a powdery material in a free-flowing state. Further, when this product is removed from the drying system it retains its free-flowing character and does not agglomerate into masses. In addition, the spray-drying does not cause any heat damage to the material under process so that the product retains the natural color, odor, taste, and nutritive qualities of the original juice or other liquid food.

The principles of the invention can best be explained in connection with the appended drawing. In Fig. 1 is shown one modification of the apparatus within the scope of this invention. Referring to this figure, the liquid to be dehydrated is pumped into drying chamber 1 via pipe 2, the liquid being sprayed in the form of fine droplets by atomizer 3. Hot air for evaporating moisture from the feed liquid, is fed by duct 4 into cylindrical plenum chamber 5 from whence the hot air flows downward into chamber 1 via perforations 6. A sleeve 7 is provided to insulate feed pipe 2 from the plenum chamber thus to avoid heating the liquid prior to its being atomized. Duct 4 preferably enters plenum 5 radially to minimize swirling of the entering hot air. It is undesirable to have the entering hot air swirl in chamber 1 as this would cause the particles to be thrown toward the walls of the chamber 1 whereby they might adhere thereto. The use of the perforations 6, or similar structure such as grids, wire screening, etc. also assist in distributing uniformly the flow of hot air in a straight downward path in chamber 1.

The hot air fed into the system via duct 4 and plenum 5 may have a temperature about from 300 to 600° F., depending on a variety of factors such as moisture content of liquid, feed rates of liquid and hot air, moisture content desired in the final product, etc. The temperature of the entering hot air may be far above the temperature which would normally damage the product because of the intensive cooling effect which takes place in the drying chamber whereby the product assumes a temperature considerably lower than the temperature of the incoming hot air.

Within chamber 1, the hot air and atomized liquid come into intimate contact in the vicinity of the atomizer 3 whereby the liquid is rapidly evaporated forming small particles of partly dried material suspended in the air stream. Because of the cooling effect of the evaporation, the mass of air traveling downwardly becomes cooler than the inlet air temperature. As the particles continue to move down through chamber 1 they are subjected to drying in the drying zone 48 which, because of the cooling effect, may have a temperature of about 200–350° F., depending on the regulated conditions of feed rates of liquid and hot air, original moisture content of the liquid, etc.

An annular plenum chamber 8 is located about the lower part of the outer periphery of chamber 1. Cool air, that is, air at about room temperature, is introduced via duct 9 into plenum chamber 8. A series of nozzles 10 located about the inner circumference of chamber 1 causes the cool air to be introduced into the stream of hot air and suspended dried particles, the flow of air being directed downwardly along the conical walls of sleeve 11. Introduction of cool air in this manner brings about several benefits. In the first place, the stream of hot air and suspended dried particles is reduced in temperature with the result that heat transfer from the surrounding atmosphere to the now dry particles is substantially reduced or even completely stopped. This means that the particles will not assume a sticky state, by reason of increase in their temperature, while passing through sleeve 11, conduit 12, or the collection equipment. In addition it means that the particles will not suffer scorching or other heat damage. Another benefit is that the flow of cool air sweeps the conical sleeve 11 and thus prevents the particles from contacting this solid surface, thus further reducing the possibility of the particles adhering to this surface. The importance of this feature of adding cool air is further explained at length hereinafter.

The current of exhaust air and dried particles flows through exhaust duct 12 into collector 13 which is essentially a conventional centrifugal or cyclone separator. The current of exhaust air and dried particles enters collector 13 tangentially whereby a separation occurs, the air being vented through duct 14 and the product falling into pipe 15.

The product moving through pipe 15 is surrounded by an atmosphere of humid air. If this product were removed from the system at this stage it would upon cooling becomes sticky and agglomerate to a tough mass. To prevent this, there is provided a secondary collecting system which operates as follows:

Air which has been dehumidified, that is, dried, by passing it through saturated lithium chloride solution, anyhydrous calcium chloride, silica gel, or other desiccating medium is forced under pressure through pipe 16 into nozzle 17. The jet of air issuing form nozzle 17 creates a zone of decreased pressure whereby the dried material is sucked out of pipe 15 into duct 18 from whence it flows into collector 19 which is a conventional separator of the centrifugal or cyclone type like collector 13. The dried product flows out of pipe 20, through valve 21 into a suitable container, preferably one which is closed to prevent ingress of atmospheric, necessarily humid, air. The product so collected is surrounded by a dry atmosphere and subsequently will not cake on storage but remain in a free-flowing condition. Another advantage of this step of the process is that contact of the dehumidified air with the product causes additional dehydration thereof. Thus the powder leaving through pipe 20 will have a lower moisture content than the powder sucked into duct 18.

It is generally preferred to operate the drying system under partial vacuum, for example a vacuum of about 10 to 20 inches of water. To accomplish this mode of operation the primary exhaust fan 22 is of such capacity as to exhaust the entire system. Thus the hot air in duct 4 and the cool air in duct 9 are drawn into the system by the partial vacuum produced by fan 22, these gases eventually flowing through duct 12, separator 13, duct 14, and out of vent 23.

A secondary fan 24 is provided so that the pressure in separator 19 may be maintained lower than in separator 13. The exhaust from fan 24 is connected by duct 25 to the intake duct 14 of primary fan 22 or, if desired, may be injected tangentially into duct 12 at the point where said duct enters collector 13.

It is obvious that the system can be operated under a positive pressure if desired. In such case the hot air and the cool air would be forced into ducts 4 and 9 by the use of suitable fans and collectors 13 and 19 would simply be vented to the atmosphere.

Referring now to Fig. 2 which illustrates another modification of apparatus within the ambit of this invention, the liquid to be dehydrated is fed by pipe 2 to atomizer 3 (not illustrated in this figure) whereby the liquid is sprayed into the interior of drying chamber 30.

Primary hot air for causing dehydration of the liquid is introduced into chamber 30 via duct 4 and plenum chamber 5, having structure and arrangements as in the modification of Fig. 1.

Drying chamber 30 is formed of two concentric shells, an outer imperforate shell 31 and an inner perforate shell 32. The space between shells 31, 32, divider 33 and the top of the dryer chamber defines a plenum chamber 34 into which is fed hot air by duct 35. This secondary hot air is fed into drying chamber 30 by perforations 36. In operation, the hot air issuing from perforations 36 blankets the inside of shell 32 with air and so prevents any of the sprayed particles from impinging on the wall. The secondary current of hot air thus minimizes possibility of product or original liquid from adhering to the walls of the drying chamber and it also causes additional drying. The proportion of primary and secondary hot air fed into the system can be regulated by adjustment of dampers 37 and 38, respectively.

The lower portion of drying chamber 30 as well as the right-angle turn at its base defining a conduit is also formed of the concentric shells 31 and 32. The plenum chamber 39 in this case is however supplied with cool air, that is, air at about room temperature, entering the system via duct 40. The cool air flows through apertures 41 thus mingling with the stream of hot air and suspended dried particles thereby preventing the particles from becoming overheated and sticky and also blowing the particles inwardly from the wall surfaces thus preventing the particles from impinging on and possibly adhering to the wall surfaces.

The current of dried particles and exhaust air flows through duct 42 to collector 13 which operates the same as it does in the modification of Fig. 1. The dried product is aspirated by a stream of de-humidified air into duct 18 and second collector 19, all as described above in regard to the device of Fig. 1, the dried product being withdrawn through pipe 20.

To operate the system under a partial vacuum there is provided a fan 22 whereby hot air (ducts 4, 35) and cool air (duct 40) are drawn into the system. The exhaust vent 25 of collector 19 may be connected directly to the intake end of fan 22 as shown, or a secondary fan may be inserted in vent 25 as described with the modification of Fig. 1. By regulation of dampers 43, 44, the desired pressure levels in collectors 13 and 19 may be maintained. It is evident that if desired the drying system may be maintained at a positive pressure by suitable rearrangement of the fans.

Reference has been made above to the feature of introducing cool air (via nozzles 10 or perforations 41) into the lower portion of the dryer chamber to reduce heating of the dried particles and sweep them away from the walls of the drying system. In practicing this technique, a certain balance between deleterious effects need be exercised in that the temperature, humidity, and/or volume of the cooling air should be regulated to obtain an adequate cooling effect without causing the particles to become sticky by virtue of their being subjected to air of too high relative humidity caused by too drastic a decrease in temperature. This situation is further explained as follows:

Initially the liquid to be dehydrated is atomized in drying chamber 1 or 30. Here the liquid is contacted with the blast of hot inlet air issuing from plenum chamber 5. As the liquid and hot air flow downwardly, evaporation takes place at a rapid rate with the result that the temperature at and about the center of the drying chamber (48 in Fig. 1) where the final phases of the drying occur is lower than the inlet air temperature. A typical situation might be for example that the inlet air temperature is 405° F. whereas the temperature in the drying zone is only 320° F. The particles are undergoing rapid evaporation in moving from the atomizer to this zone and their temperature is considerably lower than the surrounding air, probably not higher than 120° F. (wet bulb temperature of the air). As the process proceeds and the particles and air move through the drying zone toward the exit conduit, the rate of evaporation decreases markedly and the temperature of the particles tends to rise abruptly, it being realized that these particles are surrounded with a large mass of air at about 320° F. and by this time the particles are no longer cooled by the evaporation of moisture. At this stage in the process, cooling air is introduced in accordance with this invention. However if on the one hand, no cooling air or an insufficient amount of cooling air is added, the result will be that the particles will continue to be heated by the surrounding hot air and consequently the particles may become sticky simply due to their assuming too high a temperature. If the particles get sticky they will tend to adhere to the walls of the cyclone collector or other parts of the device. In addition, the products may be scorched, that is, the high temperature may cause deleterious changes in the color, odor, or taste of the products. If, on the other hand, too much cooling air is introduced deleterious effects will also be attained. Thus it must be realized that when the exhaust air is cooled its relative humidity rises. This in turn means that then there will be created a driving potential which will force moisture from the air stream into the dried particles so that the particles will get sticky by reason of their increase in moisture content. Pick-up of moisture by the particles is also undesirable as it damages their storage properties.

In our practice of this invention, we avoid both the pitfalls of (*a*) too high exit air temperature which causes stickiness by rise in temperature ("hot-sticky") and scorching of the product and (*b*) too low exit air temperature which causes stickiness by rise in relative humidity ("wet-sticky"). This we do by introducing cooling air at a temperature and volume such that the mixed stream of air leaving the drying chamber has a temperature substantially below the temperature which exists in the drying zone but which is still so high that danger of re-absorption of moisture by the particles is prevented. It is difficult to designate in exact units the level to which the temperature of the mixed stream should be reduced because there are so many inter-related factors which play a part in the behavior of the particles as concerns their remaining free-flowing or becoming sticky. Thus in addition to temperature, factors to be considered are: time during which the particles are to be exposed to certain temperatures; nature of the particles themselves from a chemical and physical standpoint; relative humidity of the air stream before and after cooling; the size of the particles; and the distribution of residual moisture in the particles—that is, whether the moisture is uniformly dispersed or mostly in the center; etc. Usually it is simplest for the operator to vary the amount of the cooling air during the process and note whether or not the product is appearing in the first collector in a proper free-flowing condition and make a suitable adjustment of the cool air flow rate if it is not. In the case of the experiments we have performed drying tomato juice and orange juice it has been found that generally good results are attained by adding sufficient cooling air so that the mixed air stream leaving the drying chamber has a temperature of about 10 to about 50° F., preferably 20 to 30° F., higher than the sticky point of the dried particles. By adding cooling air at such levels, the danger of causing "wet stickiness" is avoided because the relative humidity of the combined air stream is not unduly increased. At the same time the air about the particles while still hot is nowhere near as hot as it would be without the added cooling air and the net result is that the dried particles are subjected to a greatly reduced temperature gradient whereby the rate of heating of the particles is greatly reduced. It is further to be observed that in our process the dried particles are in contact with the exhaust air in sleeve 11, duct 12 and collector 13 for a very short time, on the order of a few seconds, whereby there is insufficient time for the particles to reach the temperature of the surounding air stream, it being realized that the temperature gradient to which the particles are subjected during this time is of a low order of magnitude. The net result is that the particles do not become overheated so that they are not scorched and neither do they become sticky; also an increase in moisture content in the product is avoided.

In the devices shown in the figures, the hot air and liquid to be dried are fed into the top of the drying chamber and the exhaust air and dried particles are removed from the bottom of the chamber. In another modification, this system may be completely reversed so that the hot air and liquid enter the bottom of the chamber and the exhaust air and dried product are withdrawn through the top of the chamber. In such case, the equipment for adding cooling air would be re-located to flush with cool air the surfaces of the connecting sleeve, conduit, etc. In effect one would simply invert the drying chambers and auxiliary parts shown in Figs. 1 and 2. Such an up-flowing system has the advantages that coarser particles, which naturally require longer time for evaporation, would, because of their greater density and greater resistance to flotation by the air stream, remain in the drying chamber longer than the fine particles, and thereby dry down to satisfactory moisture contents.

The cool air introduced into ducts 9 or 40 is ordinarily room air. If desired, this air may be de-humidified first so as to decrease the probability of the dried particles absorbing moisture from the combined air stream (the exhaust hot air plus cooling air).

Although the present invention may be utilized for the spray drying of any aqueous solution or slurry, it is particularly adapted for the spray drying of fruit and vegetable liquid foods because as explained above, the invention is particularly adapted for correcting the disadvantages occurring when such materials are spray dried in conventional apparatus. The liquid food may be for example a juice, puree, extract, concentrated juice, etc. The liquid preparation may be clear, may contain suspended pulp or even be thick like a puree or concentrated juice. The liquid food may be derived for example from tomatoes, oranges, lemons, grapefruit, apricots, strawberries, raspberries, cranberries, pineapple, apples, pears, grapes, prunes, peaches, celery, cabbage, water-cress, spinach, carrots, lettuce, and so forth. In spray drying fruit or vegetable juices it is usually preferred to first evaporate the juice under vacuum to prepare a liquid concentrate containing, say, from 20 to 50% solids and apply this liquid concentrate to the spray drying.

In some cases it is desirable to add a sulphiting agent to the fruit or vegetable juice prior to spray drying to protect the food principles from browning or oxidative deterioration. Agents such as sodium sulphite, sodium bisulphite, or sulphur dioxide may be used for such purpose and are generally effective when added in a proportion to provide an $SO_2$ concentration of around 100 to 1000 p.p.m. Ascorbic acid, which is well known for its ability to protect foods from discoloration on contact with air, may be used instead of a sulphiting agent. Other antioxidants which may be used are listed in the Strashum Patent No. 2,557,155, June 19, 1951.

It is a feature of this invention that tomato juice and other fruit and vegetable liquids can be dehydrated without the addition of any drying-aid thus to prepare a final dehydrated product which contains essentially 100% of the natural product. However in some cases it may be desirable to add a drying aid to the liquid prior to dehydration to assist in preserving the product as a free-flowing powder when stored for long periods of time or when stored in vessels which are to be periodically opened for removal of part of the contents. Many different drying aids are suitable for such purpose as known to those skilled in the art, for example egg albumin, dextrin, corn syrup solids, gelatin, pectin, sodium carboxymethyl cellulose, methyl cellulose, sodium alginate, solubilized starch and so forth.

If desired various flavoring agents may be incorporated in the liquid prior to spray-drying thus to be present in the final product. For example sugar may be added to liquid fruit products or salt may be added to liquid vegetable products. Such materials such as sugar and milk or cream, etc. may be added to fruit juices prior to dehydration to prepare dried products useful as dry ice cream or sherbet mixes. Further extensions of this principle will be obvious to those skilled in the art.

The invention is further illustrated by the following example. The abbreviations "BD" and "p.p.m.," refer to bone dry and parts per million, respectively.

*Example*

Tomato juice was evaporated under vacuum to a solids content of 20%. Into the concentrate was incorporated 2% salt (NaCl) and sufficient sodium bisulphite to establish an $SO_2$ concentration of 200 p.p.m.

The concentrate was then dried in a device as depicted in Fig. 1. The drying chamber 1 had a diameter of 8 ft. 4 in. and a depth of 13 ft. 7 in. The conditions of operation are set forth below:

| | |
|---|---|
| Feed rate of tomato concentrates | 4 lbs./min. |
| Hot air flow rate (into duct 4) | 160 lbs./min. (BD basis). |
| Hot air temperature | 405° F. |
| Cold air flow rate (into duct 9) | 157 lbs./min. (BD basis). |
| Cold air temperature | 64° F. |
| Cold air humidity | 0.009 lb. $H_2O$/lb. BD air. |
| Dehumidified air flow rate (into pipe 16) | 22 lbs./min. |
| Dehumidified air temperature | 102° F. |
| Dehumidified air humidity | 0.003 lb. $H_2O$/lb. BD air. |
| Air in primary collector 13, temp. | 168° F. |
| Air in primary collector 13, humidity | 0.019 lb. $H_2O$/lb. BD air. |
| Air in secondary collector 19, temp. | 109° F. |
| Air in secondary collector 19, humidity | 0.005 lb. $H_2O$/lb. BD air. |
| Moisture content of tomato powder product | 2%. |

It was found that the tomato powder so prepared was free-flowing and on reconstitution with water formed a juice which could not be distinguished in color, odor, or taste from a juice prepared by diluting the original concentrate with water. This indicated that the spray drying process did not cause any damage to the tomato material.

In carrying out this process to obtain a powder of desired moisture content, the formula given below is useful to determine the various factors necessary to get the desired product.

$$P=\frac{1.41MF}{H}-\frac{T_h-383}{31.3}$$

wherein:

P is the moisture content of the product in percent.

M is the moisture content of the liquid to be dried in percent.

F is the feed rate of the liquid in lbs./min.

H is the feed rate of the hot air in lbs./min., specifically 160 lbs./min. with the constants of 383 and 31.3 given. The constants 383 and 31.3 have the dimensions of degrees Fahrenheit.

$T_h$ is the temperature of the entering hot air in ° F.

To use this information, suppose the aim was to produce tomato powder of 1.2% moisture content from a 30% tomato juice concentrate. The values of P, M, and H would be 1.2, 70, and 160, respectively. The values of F and $T_h$ would then be selected to make the above equation balance.

It is not claimed that the equation given above will hold exactly for other products and spray drying systems. The equation has been found to hold for tomato within reasonable limits on the equipment of Fig. 1 described herein and it is believed applicable to other systems when suitably adjusted for differences in size of drying chamber, type of atomizer, feed rate of hot air, and so forth.

We claim:

1. A spray-drying system comprising: a pair of spaced, concentric shells of circular cross-section, one being an outer imperforate shell, the other being an inner perforate shell, said shells defining a drying chamber, an exhaust conduit having a smaller diameter than the chamber, and a conical section connecting said chamber and conduit; the space between said inner and outer shells being divided by a wall into a first plenum about the drying chamber and a second plenum about both the conical section and the conduit; means for spraying a liquid into the drying chamber; means for introducing hot air into the drying chamber; means for introducing additional hot air into said first plenum and hence through the inner perforated shell into the drying chamber; and means for introducing cool air into said second plenum and hence through the inner perforated shell into said conical section and said conduit.

2. A spray-drying system comprising a spray-drying chamber, means for spraying a liquid into the chamber, means for introducing hot air into the chamber, a single conduit for simultaneously removing both exhaust air and dried particles from the chamber, a sleeve connecting said chamber and conduit and tapering inwardly from the chamber to the conduit, said conduit including an outer imperforate wall and an inner perforate wall, and means for introducing cooling air into the space between said walls and through said inner perforate wall.

References Cited in the file of this patent

UNITED STATES PATENTS

| | | |
|---|---|---|
| 843,848 | Schleyder | Feb. 12, 1907 |
| 1,771,829 | Wagner | July 29, 1930 |
| 1,829,477 | Douthitt | Oct. 27, 1931 |
| 2,043,378 | Igarashi et al. | June 9, 1936 |
| 2,142,983 | Thurman | Jan. 3, 1939 |
| 2,240,854 | Peebles | May 6, 1941 |
| 2,333,333 | Peebles | Nov. 2, 1943 |
| 2,387,458 | Majonnier | Oct. 23, 1945 |
| 2,634,808 | Arnold | Apr. 14, 1953 |

FOREIGN PATENTS

| | | |
|---|---|---|
| 1,051,565 | France | Nov. 18, 1954 |